Oct. 12, 1954
E. A. RUTENBER
2,691,369
DRIP PAN FOR COOKING RANGES
Filed April 17, 1947
2 Sheets-Sheet 1
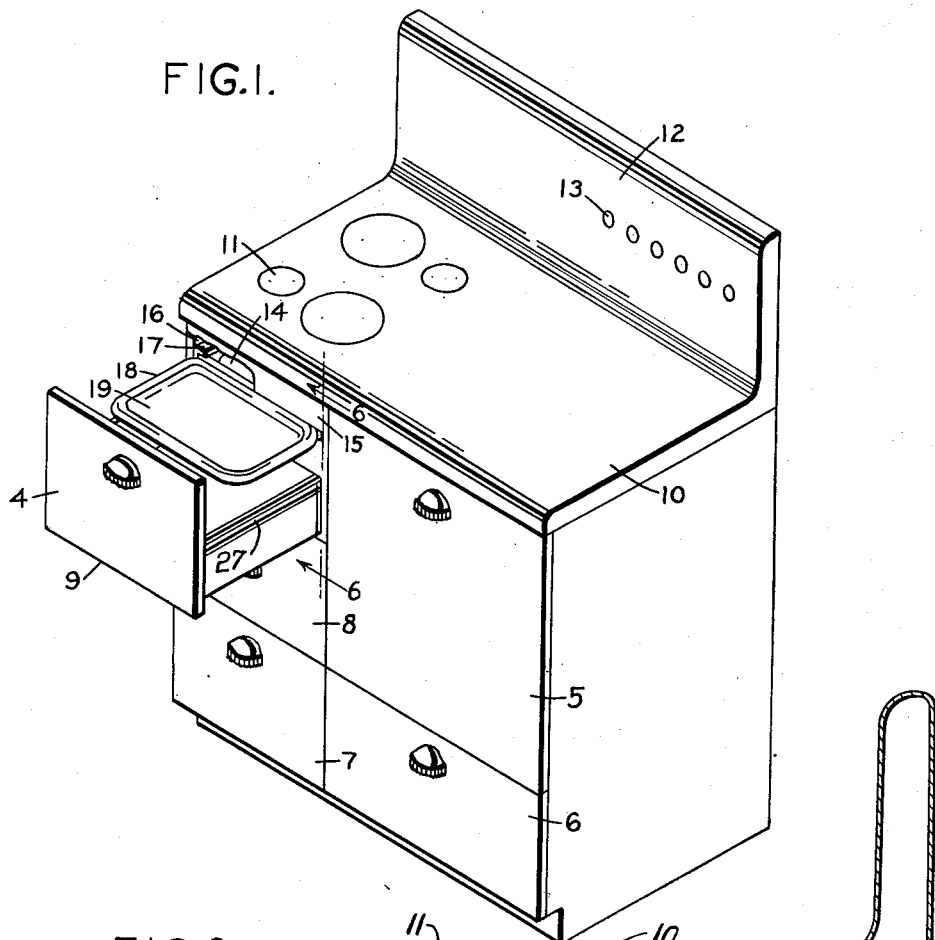
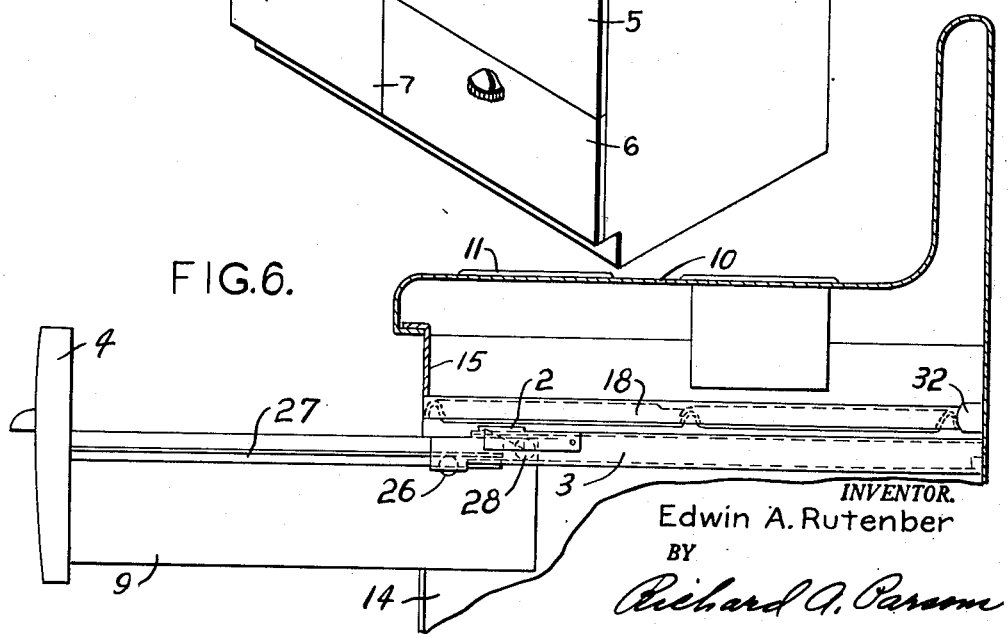
INVENTOR.
Edwin A. Rutenber
BY Oct. 12, 1954   E. A. RUTENBER   2,691,369
DRIP PAN FOR COOKING RANGES
Filed April 17, 1947   2 Sheets-Sheet 2
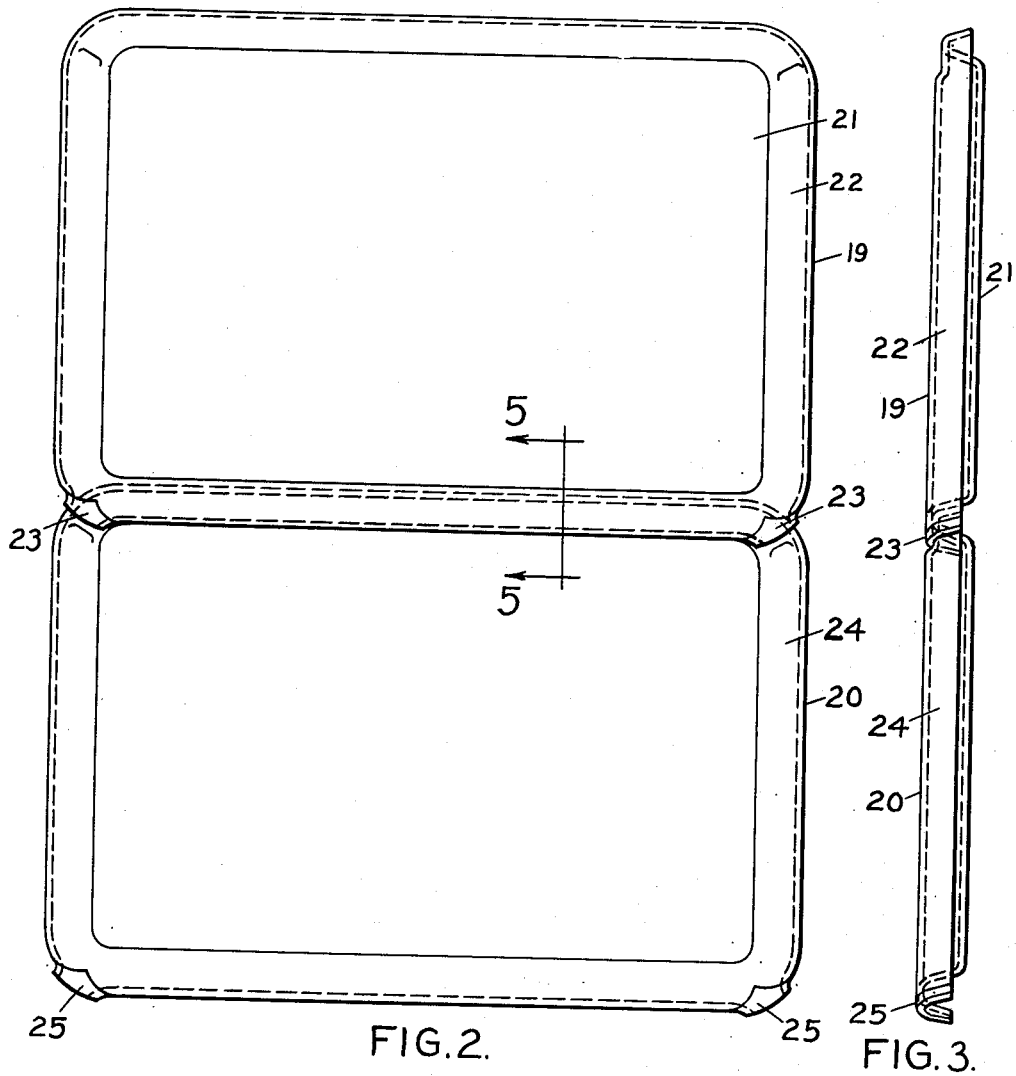
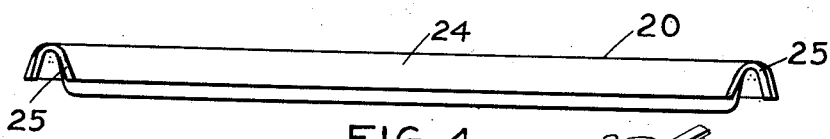
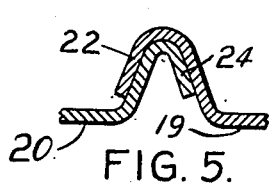
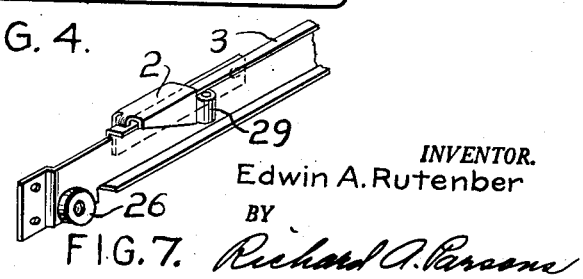
INVENTOR.
Edwin A. Rutenber
BY
Richard A. Parsons Patented Oct. 12, 1954

2,691,369

UNITED STATES PATENT OFFICE 2,691,369

DRIP PAN FOR COOKING RANGES

Edwin A. Rutenber, Greenville, Mich., assignor to Gibson Refrigerator Company, Greenville, Mich., a corporation of Michigan Application April 17, 1947, Serial No. 742,170

6 Claims. (Cl. 126—332)

This invention relates to cooking ranges and more particularly to the drip pans therefor.

In the modern cooking ranges it is customary to provide a drip pan beneath the top wall of the range and located in a position to catch any liquids or particles of solid matter falling from the surface burners on the range. The customary drip pan is inserted into the range through a slot in an upright front panel and is slidably mounted in horizontal guideways attached to the range behind the panel. In modern flush front ranges the front edge of the drip pan and the front panel through which the drip pan is inserted are usually covered by a hinged door when the drip pan is in place on the range.

There are several disadvantages to the conventional drip pan. One serious disadvantage is that such pans are extremely large and relatively heavy, making it difficult to wash them in the usual household kitchen sink. Furthermore, such drip pans are usually enameled, and if the enamel is chipped and corrosion of the metal sets in, it becomes necessary to replace the entire pan.

A further disadvantage of previous drip pans is that it is impracticable to cover the front edge thereof by the front wall of a sliding drawer, because a drawer cannot be opened sufficiently to permit removal of the drip pan.

Accordingly, the principal object of the present invention is to provide a novel drip pan formed in two parts which can be readily attached to and detached from each other.

Another object of the invention is to provide a two piece drip pan, both parts of which are identical, and consequently can be made in the same die.

A still further object of the invention is to provide a two piece drip pan, the parts of which are held in proper relationship to each other by the construction of the parts in cooperation with the guides in which the drip pan slides.

These objects and others ancillary thereto will more fully appear in the following specification when read in connection with the accompanying drawings, wherein:

Figure 1 is a perspective view of a cooking range embodying the present invention, with one drawer open, a part of the range being broken away to show the interior construction thereof;

Figure 2 is a plan view of the two-piece drip pan;

Figure 3 is a side elevational view of the drip pan;

Figure 4 is a front elevational view of the drip pan;

Figure 5 is a fragmentary cross-sectional view taken on substantially the line 5—5 of Figure 2;

Figure 6 is a fragmentary cross-sectional view through the range taken just to the right of the drawer 9 shown in Figure 1; and Figure 7 is a fragmentary perspective view of one of the drawer guides.

Referring now to the drawings in more detail, Figure 1 discloses an electric cooking range of substantially conventional design. The range is provided with a top 10 having four surface burners 11 at one end thereof. The range top is also provided with an upright splash panel 12 at the rear thereof on which are mounted knobs 13 for the conventional controls for the surface burners 11 and the range oven.

Below the range top are a plurality of compartments which house the usual oven and a plurality of sliding drawers. The oven is closed by a hinged door 5. The drawers are designated by the numerals 6, 7, 8 and 9.

One compartment 14, located below the surface burners 11, houses the drawer 9 and a drip pan 18 which will be more fully described later. The compartment 14 is provided with upright parallel side walls 16.

A pair of coplanar channel shaped guideways 17 are attached to the side walls 16 to receive the drip pan 18. Preferably a front panel 15 extends downwardly from the range top 10 past the guideways 17 and is provided with a slot aligned with the front ends of the guideways 17. The drip pan 18 is inserted into the guideways 17 through the slot.

The drawer 9 is of rectangular box shape open at the top. The drawer is mounted in the range for sliding movement in conventional guideways 3 with stops 2 thereon of the character shown in the patent to Moecker et al. No. 1,810,843. There are two similar, but oppositely arranged guideways 3 mounted on opposite side walls of the compartment 14. The guideway shown in Figure 6 is the right hand one as viewed from the front of the range, while the one shown in Figure 7 is the opposite guideway. They are channel shaped in cross section and have the rollers 26 adjacent the front on which run the horizontal flanges 27 of angle members attached to the sides of the drawer.

Another pair of rollers 28 are mounted on the drawer sides near the rear and they run in channel shaped guideways 3.

A pair of stops 2 are pivotally connected to the guideways 3 as shown best in Figure 7. The stops have projections 29 which extend into the paths of rollers 28 and prevent the drawer from being pulled completely out unless the stops are swung upwardly about their pivots. The drawer 9 is provided with a front wall 4 of greater vertical extent than the sides of the drawer. In fact, the front wall 4 is sufficiently high to completely overlie the front panel 15 when the drawer 9 is closed. The drawer 9 may be substantially coextensive with the horizontal extent of the compartment 14. However, in order to properly support the same when opened, the drawer cannot be pulled completely forward. Instead, a substantial portion of the drawer must be left supported in its guideways when pulled to its opened position, as described above.

The drip pan 18 of the present invention is composed of two identical trays 19 and 20 (see Figures 2 and 3). The front tray 19 is a one-piece sheet metal stamping of generally rectangular configuration, but having rounded corners. It is provided with a flat bottom wall 21. The bottom wall 21 is surrounded by an upstanding perimetral rib 22 of hollow channel shaped cross-section with the channel opening downwardly. The cross-sectional shape of the channel is uniform throughout the perimeter of the tray 19 except at the two rear corners thereof.

At the two rear corners of the front tray 19, the outer wall of the channel shaped rib 22 is interrupted by having portions 23 pressed upwardly and outwardly, as indicated at 23 (see Figure 2). The portions 23 are pressed into such a shape that they fit over the rounded front corners of a corresponding rib 24 on the rear tray 20. Thus, the rear edge of the front tray 19 can be placed upon the front edge of the rear tray 20 in overlapping relationship, as indicated in Figures 2, 3 and 5.

The rear tray 20 is, as mentioned above, identical with the front tray 19 and its perimetral rib 24 is provided with portions 25 at the rear corners thereof which are pressed upwardly and outwardly exactly as are the portions 23 on the front tray 19.

To insert the drip pan 18 into the range the drawer 9 is opened sufficiently to permit insertion of the rear edge of the rear tray 20 into the channel shaped guideways 17. The rear tray 20 is then placed in the guideways 17 and slid rearwardly until it is firmly held therein but with the front edge of the tray 20 projecting forwardly from the panel 15. The rear edge of the front tray 19 is then placed upon the front edge of the rear tray in overlapping relationship, as shown in Figures 2 and 4, and the entire drip pan is pushed into position within the guideways and beneath the surface burners 11. A stop 32 in the form of an abutment is provided at the rear of the compartment 14 to limit the rearward movement of the drip pan 18. When the drip pan 18 is thus located within the range, the flanges of the channel shaped guideways 17 prevent vertical separation of the two trays, while the overlapping engagement of the ribs 22 and 24 prevent horizontal separation of the trays. When the drip pan is in place the drawer 9 can be closed, covering the front edge of the drip pan and the panel 15.

The drip pan 18 can be readily removed by reversing the above described procedure.

Because the two trays 19 and 20 are identical, it is immaterial which tray is inserted into the range first. Furthermore, it is not important from an operational standpoint which edge of the rear drip pan is first inserted into the range. It is preferred, however, to insert the edge of the rear pan having the pressed out corners 25 toward the rear of the range because the rounded front corners of the front of the trays have a more finished appearance.

From the foregoing it will be seen that the present invention provides a drip pan which is considerably easier to handle and keep clean than previous conventional one piece drip pans. If one pan should become damaged it is not necessary to purchase a complete new pan, but the damaged tray only may be replaced. Furthermore, while the drip pan can be concealed by a hinged door in the usual manner, it is also possible to conceal it by the front wall of a sliding drawer.

The scope of the invention is indicated in the appended claims.

I claim:

1. A cooking range comprising a range top having a plurality of surface burners thereon, said range having a compartment completely underlying said surface burners, a drip pan in said compartment substantially coextensive with the horizontal cross-section thereof, said drip pan comprising front and rear trays connected together in overlapping relationship at their adjacent edges, said drip pan being mounted in said range for movement between a rearward operative position and a forward position wherein the front tray is located forwardly of said range, and means on said range limiting the forward and rearward movement of the drip pan to a distance less than the fore and aft extent of said drip pan but greater than the fore and aft extent of either tray, said front tray being separable from said rear tray when said front tray occupies said forward position.

2. A cooking range comprising a range top having a plurality of surface burners thereon, said range having a compartment below said surface burners and completely underlying the same, a drip pan in said compartment substantially coextensive with the horizontal cross-section of said compartment, said drip pan comprising front and rear trays arranged in tandem relationship for forward and rearward sliding movement relative to the range, said drip trays being detachably connected together at their adjacent edges, and closure means on said range overlying the front edge of said drip pan when the latter is in its rearward position, said closure means being movable to an open position permitting forward sliding movement of the drip pan sufficiently for either tray to completely clear the front of the range but limiting the forward sliding movement of the drip pan to a distance less than the fore and aft extent of the entire drip pan.

3. A cooking range comprising a range top having two surface burners thereon, one of said burners being located adjacent the front of the range top and the other rearwardly thereof, said range having a compartment below the portion of the range top containing said surface burners, the horizontal extent of said compartment being at least as great as said portion of the range top, a drip pan substantially coextensive with the horizontal cross-section of said compartment located beneath said burners and slidable forwardly and rearwardly of said range, said drip pan comprising a pair of trays arranged in tandem relationship and separably connected together to form a continuous surface beneath said surface burners, and means at the front of the range limiting the forward movement of said drip pan when said trays are joined together to a distance greater than the fore and aft extent of either of said trays and less than the corresponding extent of the entire drip pan.

4. A range body structure comprising a cooking top having an opening therein accommodating a surface heating unit, a compartment arranged below said heating unit and having a front opening, a rectangular drip pan disposed below said heating unit and adapted to be removed through said front opening, said compartment having a draw-out member permitting access thereto and having a front panel adapted to close said front opening and extending above said drip pan, said draw-out member having a limited outward movement, and a plurality of horizontal members disposed in registry with said front opening and adapted to receive, guide and support said drip pan, said drip pan comprising a front rectangular section and a rear rectangular section, said sections having their edge portions upstanding to form containing walls, the rear wall of said front section and the front wall of said rear section substantially abutting each other and having means for detachably interlocking the two sections together, and said sections being individually of shorter dimension from front to rear than said limited movement of said draw-out member, but having a greater combined dimension than said limited movement, whereby said sections may be readily removed individually.

5. The structure recited in claim 4 in which said rear wall of the front section is extended outwardly and downwardly to form a hook adapted to engage said front wall of the rear section, thereby providing said interlocking means.

6. A range body structure comprising a cooking top having an opening therein and a front surface having an opening therein, a surface heating unit disposed within said first-mentioned opening, a drip pan disposed below said heating unit in registry with said second-mentioned opening and slidably removable therethrough, support means for said drip pan, said drip pan comprising a front section and a rear section, said sections having their edge portions upstanding to form containing walls, said sections having means for detachably interlocking the two sections together with the rear wall of said front section and the front wall of said rear section adjacent each other, a drawer disposed below said drip pan, said drawer having a limited forward movement and including a front panel extending above said drip pan and being adapted to close said second-mentioned opening, and said sections having a greater combined dimension from front to rear than said limited movement of said drawer, but being individually of shorter dimension than said limited movement, whereby said sections may be readily removed individually.

References Cited in the file of this patent

UNITED STATES PATENTS

| Number | Name | Date |
| --- | --- | --- |
| 1,169,168 | Lane et al. | Jan. 25, 1916 |
| 1,174,367 | Vogel | Mar. 7, 1916 |
| 1,529,403 | Chadwick | Mar. 10, 1925 |
| 1,628,641 | Bolton | May 17, 1927 |
| 1,676,992 | Bergman | July 10, 1928 |
| 1,696,004 | Jackson | Dec. 18, 1928 |
| 1,708,424 | McLesky | Apr. 9, 1929 |
| 1,810,843 | Moecker et al. | June 16, 1931 |
| 1,851,150 | Breitwieser | Mar. 29, 1932 |
| 1,891,394 | Otte | Dec. 20, 1932 |
| 1,954,080 | Kahn | Apr. 10, 1934 |
| 2,048,572 | Smith | July 21, 1936 |
| 2,059,735 | Kennedy | Nov. 3, 1936 |
| 2,108,713 | Hillman | Feb. 15, 1938 |
| 2,207,814 | Ness et al. | July 16, 1940 |
| 2,248,198 | Ratz | July 8, 1941 |